(12) United States Patent
Chung

(10) Patent No.: US 7,895,898 B2
(45) Date of Patent: Mar. 1, 2011

(54) NEGATIVE PRESSURE GAUGE WITH A MULTI-STAGE POSITIONING MEANS

(75) Inventor: Donny Chung, Taipei (TW)

(73) Assignee: Pacific Hospital Supply Co., Ltd., Taipei (TW)

( * ) Notice: Subject to any disclaimer, the term of this patent is extended or adjusted under 35 U.S.C. 154(b) by 263 days.

(21) Appl. No.: 12/371,961

(22) Filed: Feb. 17, 2009

(65) Prior Publication Data

US 2010/0206086 A1    Aug. 19, 2010

(51) Int. Cl.
    *G01L 9/00*    (2006.01)
(52) U.S. Cl. .................. 73/753; 73/272 R; 73/273
(58) Field of Classification Search ............... None
    See application file for complete search history.

(56) References Cited

U.S. PATENT DOCUMENTS 2,957,345 A * 10/1960 Cheney ................. 73/147
3,677,090 A * 7/1972 Kolb .................... 73/756

\* cited by examiner

*Primary Examiner*—Lisa M Caputo
*Assistant Examiner*—Jermaine Jenkins
(74) *Attorney, Agent, or Firm*—Chun-Ming Shih; HDLS IPR Services

(57) ABSTRACT

A negative pressure gauge includes a body and a multi-stage positioning means. The body is provided with an airflow passage. The multi-stage positioning means includes a rotary piece and a cover plate. The rotary piece is pivotally connected to the body and is provided with positioning recesses and venting troughs. The cover plate covers the rotary piece and is fixedly connected to the body. The cover plate extends to form a positioning protrusion corresponding to the positioning recesses. When the rotary piece rotates with respect to the cover plate, the positioning recesses allow the positioning protrusion to be selectively positioned therein and control the communication or obstruction between the venting troughs and the airflow passage.

13 Claims, 7 Drawing Sheets

NEGATIVE PRESSURE GAUGE WITH A MULTI-STAGE POSITIONING MEANS

BACKGROUND OF THE INVENTION

1. Field of the Invention

The present invention relates to a negative pressure gauge, and in particular to a negative pressure gauge with a multi-stage positioning means.

2. Description of Prior Art

Conventional digital negative pressure gauge usually includes a body, a crystal liquid screen and an adjustment means. The pressure value of gas flowing through the body is displayed on the liquid crystal screen. The adjustment means is rotated to turn off the liquid crystal screen, so that the liquid crystal screen will not display the pressure value or the pressure value of the gas will be displayed in different units.

Usually, the adjustment means is one that can be positioned at multiple stages. When the adjustment means is positioned at different positioning points, the pressure value will be displayed on the liquid crystal screen in different units or the liquid crystal screen can be turned off. The adjustment means is selectively positioned via a plurality of recesses on a knob and a steel ball, whereby it can be positioned at multiple stages.

However, such a multi-stage positioning adjustment means achieves a multi-stage positioning effect merely by means of the engagement between the plurality of recesses on the knob and the steel ball, so that a user cannot feel clearly the adjustment means being positioned at a certain positioning point. If the user touches the adjustment means erroneously, the adjustment means may be rotated easily so as to change the value displayed on the liquid crystal screen. Thus, this is a problem existing in the multi-stage positioning adjustment means.

Therefore, in order to overcome the above problem, the present Inventor proposes a reasonable and novel structure based on his delicate researches and expert experiments.

SUMMARY OF THE INVENTION

The present invention is to provide a negative pressure gauge with a multi-stage positioning means. With the selective engagement between a positioning protrusion and positioning recesses, the negative pressure gauge can be adjusted and positioned at multiple stages.

The present invention is to provide a negative pressure gauge with a multi-stage positioning means, which includes a body and a multi-stage positioning means. The body is provided with an airflow passage. The multi-stage positioning means comprises a rotary piece and a cover plate. The rotary piece is pivotally connected to the body and provided with a plurality of positioning recesses and a plurality of venting troughs. The cover plate covers the rotary piece and is fixedly connected to the body. The cover plate extends to form a positioning protrusion corresponding to the positioning recesses. When the rotary piece rotates with respect to the cover plate, the positioning recesses allow the positioning protrusion to be selectively positioned therein and control the communication or obstruction between the venting troughs and the airflow passage.

In comparison with prior art, the present invention has advantageous features as follows. The drawback that the adjustment means of the conventional negative pressure gauge cannot be positioned reliably is overcome. As a result, the multi-stage positioning means of the present invention will not change the value displayed on the display unit due to its erroneous rotation. Further, via an auxiliary positioning means, the multi-stage positioning means can be positioned more reliably.

DETAILED DESCRIPTION OF THE INVENTION

The characteristics and technical contents of the present invention will be explained with reference to the accompanying drawings. However, the drawings are illustrative only but not used to limit the present invention.

Figure 1:
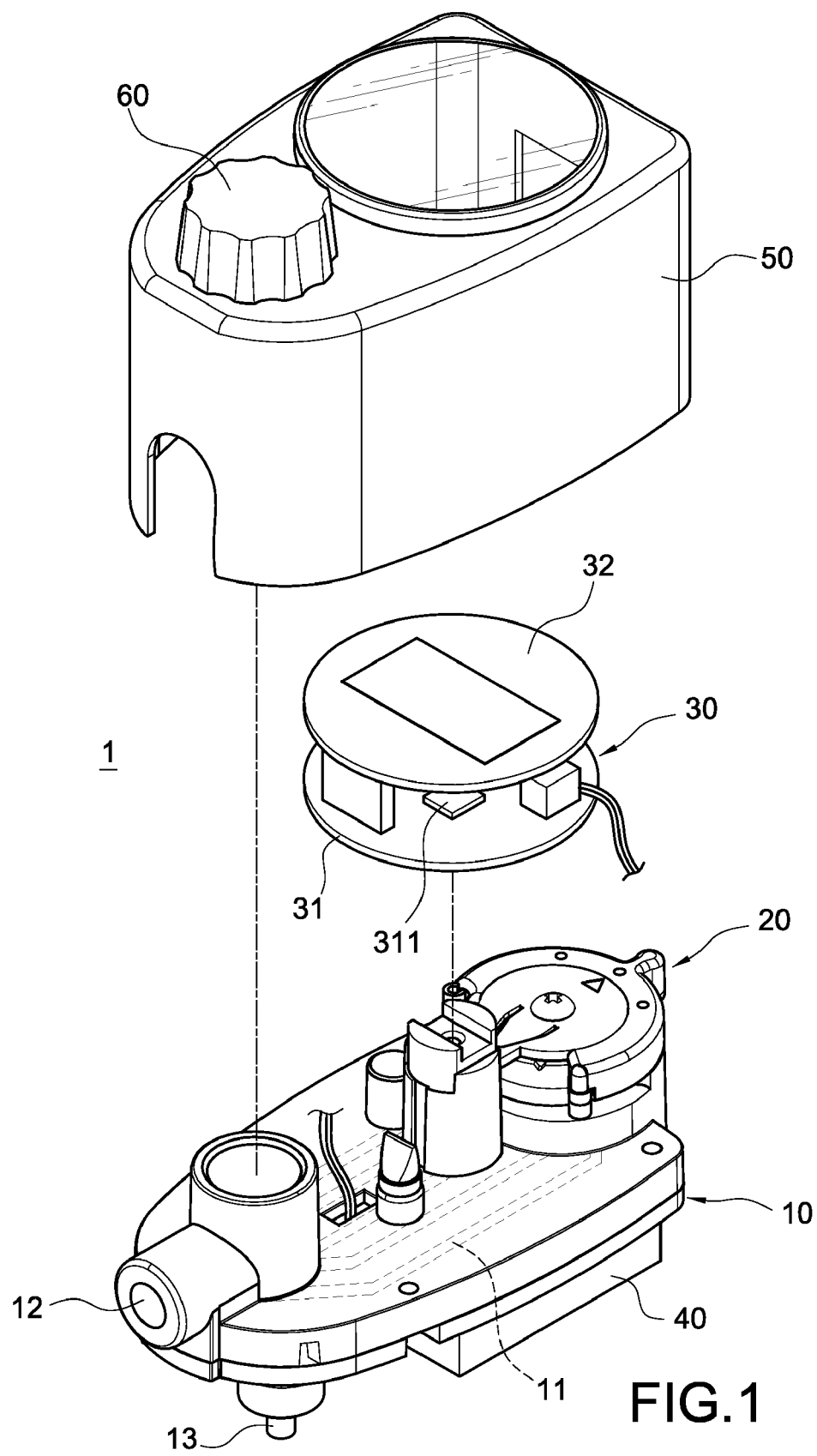
FIG. 1 is an exploded perspective view of the present invention.
Figure 2:
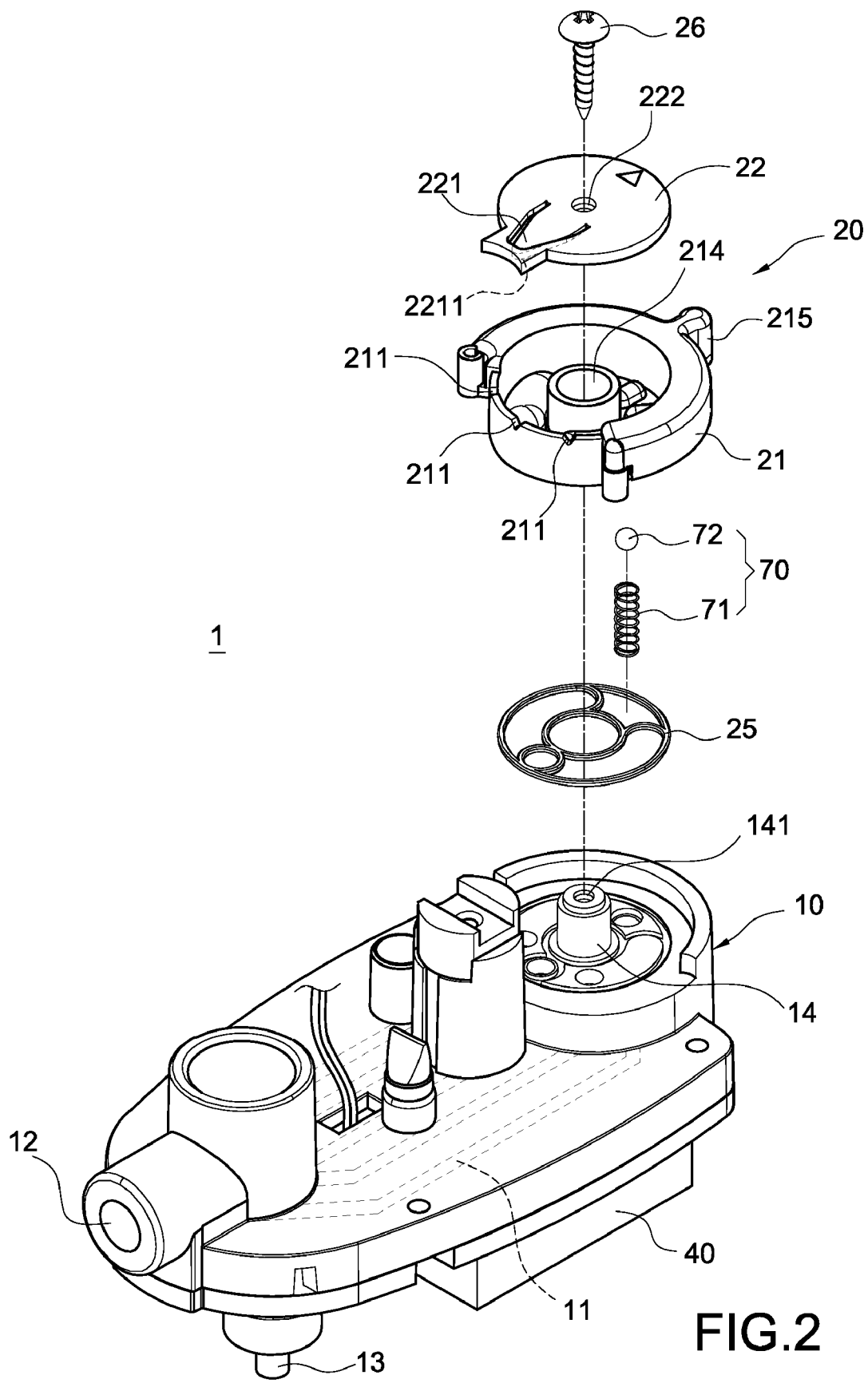
FIG. 2 is an exploded perspective view (I) showing the multi-stage positioning means of the present invention.
Figure 3:
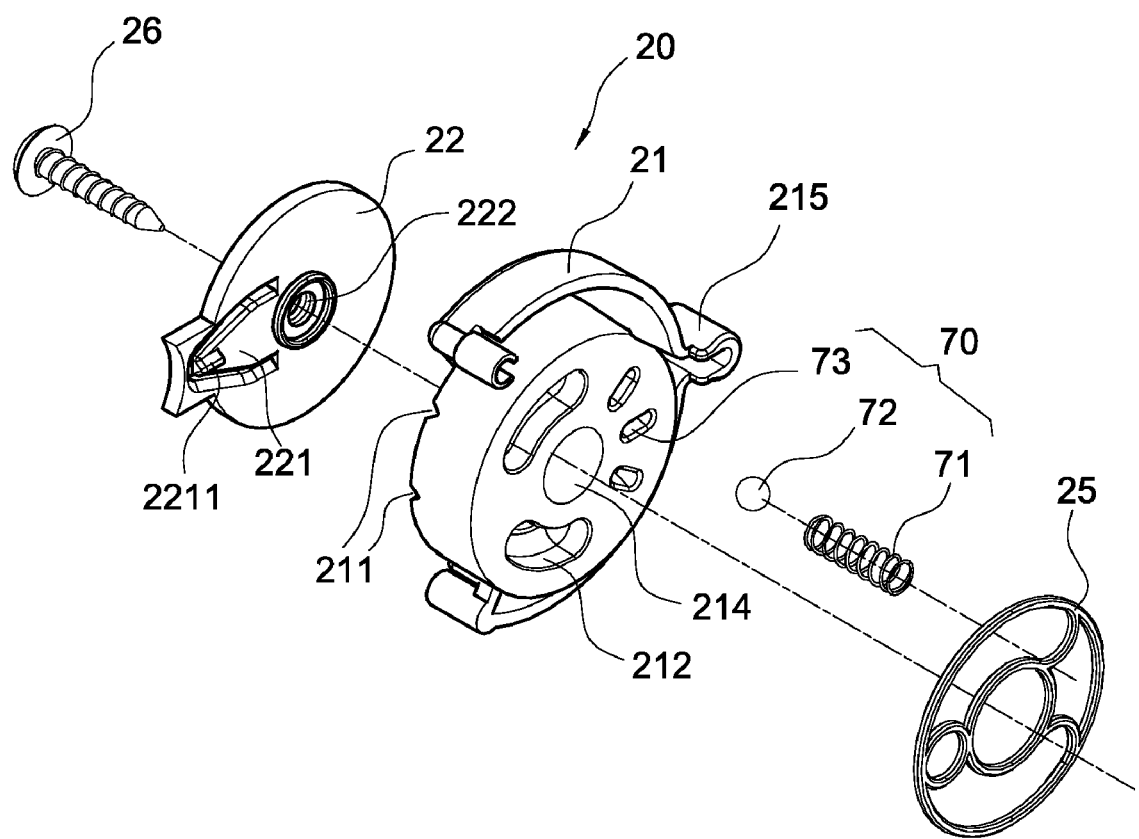
FIG. 3 is an exploded perspective view (II) showing the multi-stage positioning means of the present invention.

Please refer to FIGS. 1 to 3. FIG. 1 is an exploded perspective view of the present invention. FIGS. 2 and 3 are exploded perspective views (I) and (II) showing the multi-stage positioning means of the present invention respectively. The present invention provides a negative pressure gauge 1 with a multi-stage positioning means, which includes a body 10, a multi-stage positioning means 20, a display model 30 and a power-supplying unit 40.

The body 10 is formed with an airflow passage 11 communicating with the outside as well as an exhaust port 12 and an intake port 13 communicating with the airflow passage 11. Further, the body 10 is formed with a protruding post 14. The protruding post 14 is provided with a screw hole 141.

The multi-stage positioning means 20 comprises a rotary piece 21 and a cover plate 22. The rotary piece 21 is pivotally connected to the body 10. The rotary piece 21 is provided with a plurality of positioning recesses 211, a plurality of venting troughs 212 and a through-hole 214. The rotary piece 21 is further provided with an operating rod 215.

The through-hole 214 corresponds to the protruding post 14, so that the rotary piece 21 covers the protruding post 14 so as to be rotatable with respect to the body 10. The cover plate 22 covers on the rotary piece 21 and is fixedly connected to the body 10. The cover plate 22 is provided with an elastic piece 221. The elastic piece 221 extends to form a positioning protrusion 2211. The positioning recess 211 allows the positioning protrusion 2211 to be selectively positioned therein. Further, the cover plate 22 is provided with an unobstructed hole 222 corresponding to the through-hole 214.

When the rotary piece 21 rotates with respect to the cover plate 22, the positioning recesses 211 allow the positioning protrusion 2211 to be selectively positioned therein and control the communication and obstruction between the venting troughs 212 and the airflow passage 11.

The negative pressure gauge 1 further comprises an auxiliary positioning means 70. The auxiliary positioning means 70 comprises an elastic element 71, an abutting piece 72 and a plurality of troughs 73 formed on the rotary piece 21. The elastic piece 71 is accommodated in the body 10. The abutting piece 72 is sandwiched between the rotary piece 21 and the elastic element 71. The engagement between the abutting piece 72 and the trough 73 is in synchronization with the engagement between the positioning protrusion 2211 and the positioning recess 211. The elastic element 71 is a compression spring, and the abutting piece 72 is a steel ball. However, the elastic element and the abutting piece are not limited thereto.

A gasket 25 is provided between the rotary piece 21 and the body 10 for preventing the problem that the gas flowing through the airflow passage 11 and the venting troughs 212 may escape to make the negative pressure gauge 1 unable to measure the pressure of gas correctly. The multi-stage positioning means 20 further comprises a fixing element 26 passing through the unobstructed hole 22 and the through-hole 214 to be fixed into the screw hole 141. The fixing element 26 is a screw, but it is not limited thereto.

The display model 30 is fixed to the body 10 and is electrically connected to the multi-stage positioning means 20. The display model 30 comprises a circuit board 31 and a display panel 32 superposed on the circuit board 31. The display panel 32 is electrically connected to the circuit board 31. The circuit board 31 has a sensor unit 311. The sensor unit 311 is partially accommodated in the airflow passage 11 of the body 10 for sensing the pressure value of the gas in the airflow passage 11 and displaying the sensed pressure value on the display panel 32.

The power-supplying unit 40 is fixed on the back surface of the body 10 and is electrically connected to the display model 30 and the multi-stage positioning means 20. Further, the negative pressure gauge 1 includes an outer cover 50 covering above the body 10 and a flow regulator 60. The flow regulator 60 is inserted into the body 10 and partially accommodated in the airflow passage 11. The flow regulator 60 can be rotated to control the amount of gas flowing through the airflow passage 11.

Figure 4:
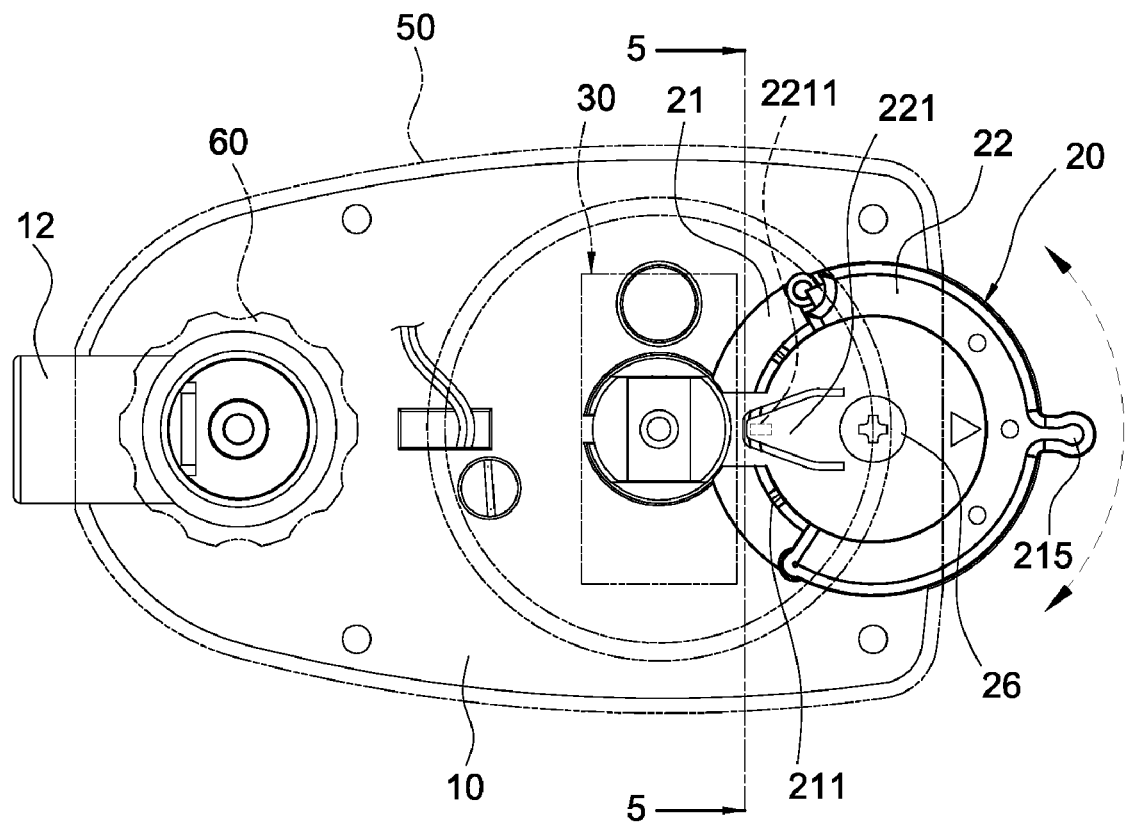
FIG. 4 is a top view of the present invention.
Figure 5:
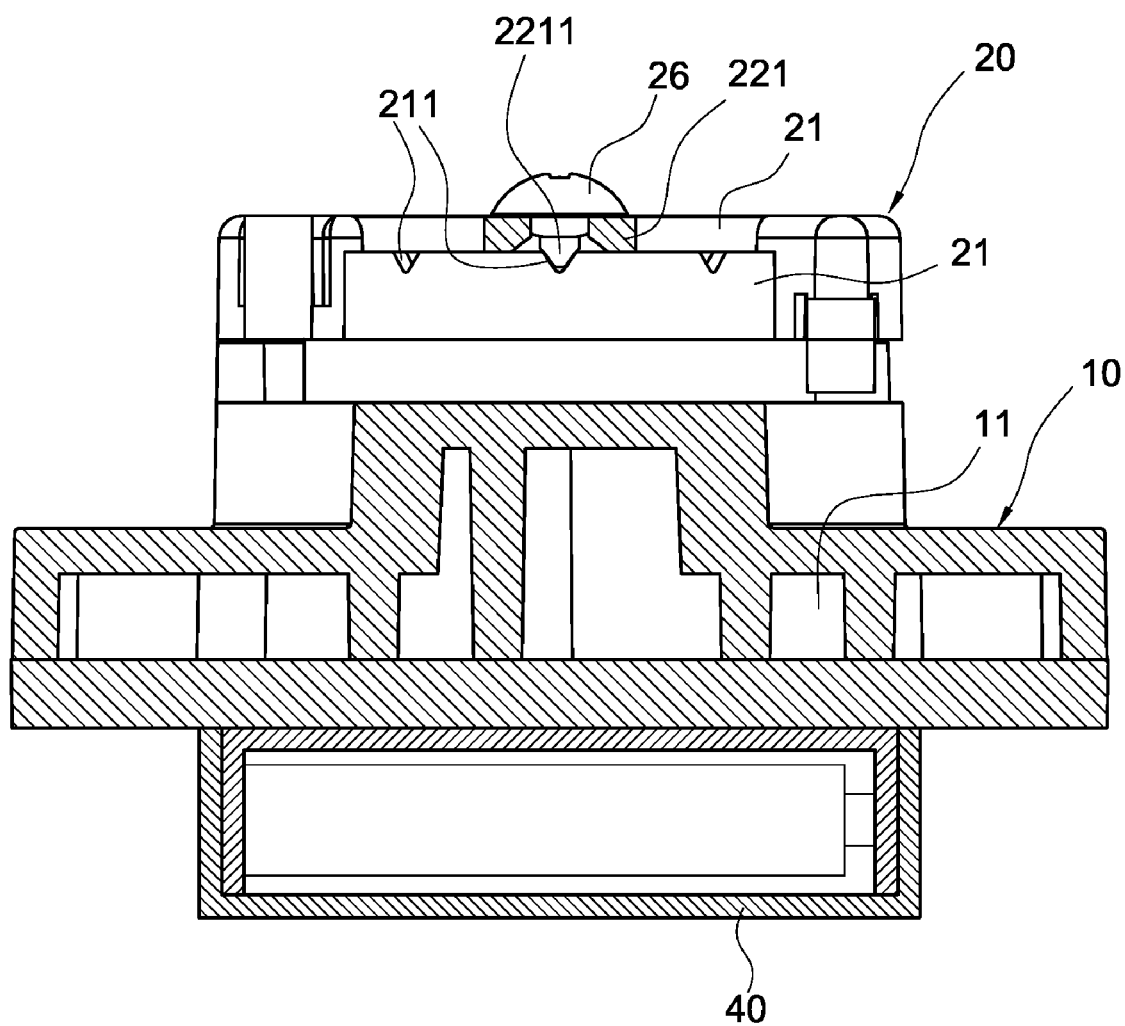
FIG. 5 is a cross-sectional view taken along the line 5-5 in FIG. 4.
Figure 6:
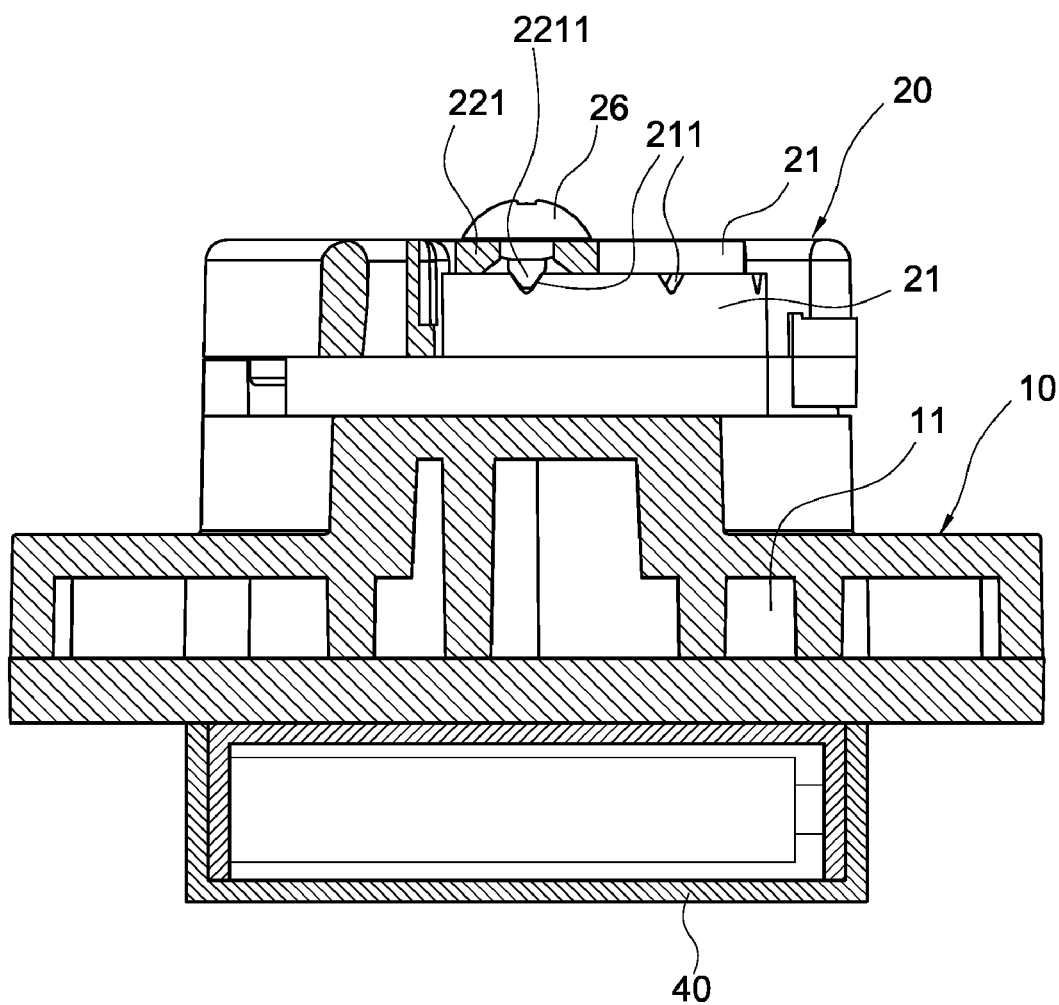
FIG. 6 is a cross-sectional action view (I) taken along the line 5-5 in FIG. 4.
Figure 7:
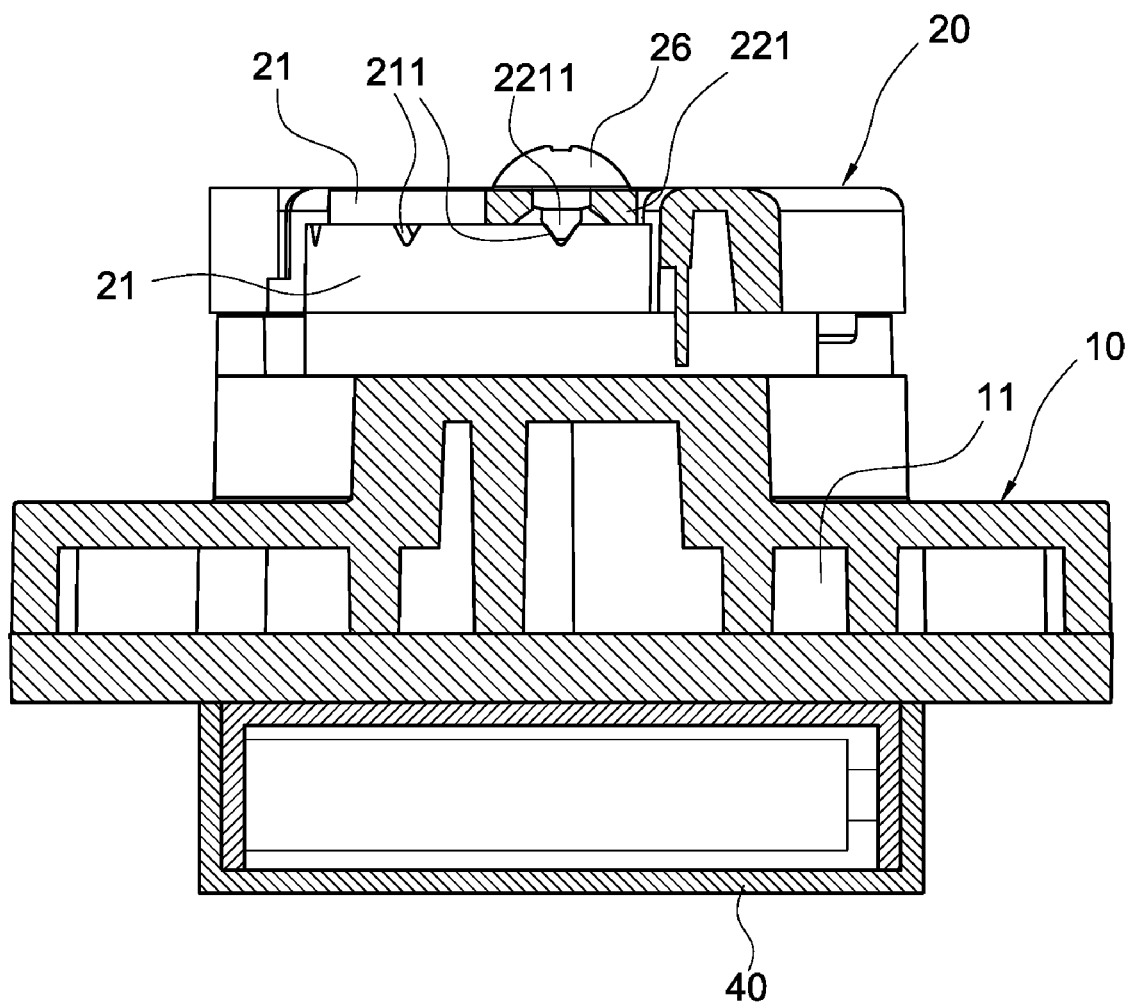
FIG. 7 is a cross-sectional action view (II) taken along the line 5-5 in FIG. 4.

Please refer to FIGS. 4 to 7. FIG. 4 is a top view of the present invention. FIG. 5 is a cross-sectional view taken along the line 5-5 in FIG. 4. FIGS. 6 and 7 are cross-sectional action views (I) and (II) taken along the line 5-5 in FIG. 4 respectively. The user pushes the operating rod 215 to make the rotary piece 21 to rotate with respect to the body 10. The rotary piece 21 is provided with three positioning recesses 211 corresponding to the positioning protrusion 2211 respectively. Via this arrangement, when the rotary piece 21 rotates with respect to the body 10, it can be positioned at three stages. The back surface of the rotary piece 21 is provided with two venting troughs 212. When the rotary piece 21 rotates to both ends with the positioning protrusion 2211 being positioned in the positioning recesses 211 on both sides, the venting troughs 212 will be brought into communication with the airflow passage 11. When the rotary piece 21 rotates back to the center with the positioning protrusion 2211 being positioned in the central positioning recess 211, the communication between the venting troughs 212 and the airflow passage 11 is obstructed. Thus, no pressure value can be displayed on the display panel 32. Due to the construction of the positioning recesses 211 and the positioning protrusion 2211, the rotary piece 21 can be positioned clearly and reliably when it rotates to a certain position.

According to the above, the negative pressure gauge with a multi-stage positioning means already demonstrates industrial practicability, novelty and inventive steps. Further, the structure of the present invention has not been seen in products of the same kind or let in public use, so that the present invention really conforms to the requirements for a utility model patent.

What is claimed is:

1. A negative pressure gauge with a multi-stage positioning means, comprising:
   a body provided with an airflow passage; and
   the multi-stage positioning means having:
      a rotary piece pivotally connected to the body and provided with a plurality of positioning recesses and a plurality of venting troughs; and
      a cover plate covering the rotary piece and fixedly connected to the body, the cover plate extending to form a positioning protrusion corresponding to the positioning recesses;
   wherein when the rotary piece rotates with respect to the cover plate, the positioning recesses allow the positioning protrusion to be selectively positioned therein and control communication or obstruction between the venting troughs and the airflow passage.

2. The negative pressure gauge with a multi-stage positioning means according to claim 1, further comprising an auxiliary positioning means, the auxiliary positioning means comprising an elastic element, an abutting piece and a plurality of troughs formed on the rotary piece, the elastic element being accommodated in the body, the abutting piece being sandwiched between the rotary piece and the elastic element, the engagement between the abutting piece and the troughs being in synchronization with the engagement between the positioning protrusion and the positioning recesses.

3. The negative pressure gauge with a multi-stage positioning means according to claim 1, further comprising a display model fixed to the body, the display model being electrically connected to the multi-stage positioning means.

4. The negative pressure gauge with a multi-stage positioning means according to claim 3, further comprising a power-supplying unit fixed to the body, the power-supplying unit being electrically connected to the display model and the multi-stage positioning means.

5. The negative pressure gauge with a multi-stage positioning means according to claim 3, wherein the display model comprises a circuit board and a display panel electrically connected to the circuit board.

6. The negative pressure gauge with a multi-stage positioning means according to claim 5, wherein the circuit board has a sensor unit, the sensor unit is partially accommodated in the airflow passage for sensing the pressure value of gas flowing through the airflow passage.

7. The negative pressure gauge with a multi-stage positioning means according to claim 1, wherein the cover plate has an elastic piece, and the positioning protrusion extends from the elastic piece.

8. The negative pressure gauge with a multi-stage positioning means according to claim 1, wherein the body is further formed with an intake port and an exhaust port communicating with the airflow passage.

9. The negative pressure gauge with a multi-stage positioning means according to claim 1, further comprising a flow regulator inserted in the body and partially accommodated in the airflow passage for controlling the amount of gas flowing through the airflow passage.

10. The negative pressure gauge with a multi-stage positioning means according to claim 1, wherein the body is formed with a protruding post, the rotary piece is provided with a through-hole, and the protruding post is pivotally inserted into the through-hole.

11. The negative pressure gauge with a multi-stage positioning means according to claim 10, wherein the multi-stage positioning means comprises a fixing element, the protruding post is provided with a screw hole, the cover plate is provided with an unobstructed hole, the fixing element passes through the unobstructed hole and the through-hole to be fixed in the screw hole.

12. The negative pressure gauge with a multi-stage positioning means according to claim 1, wherein the rotary piece is formed with an operating rod.

13. The negative pressure gauge with a multi-stage positioning means according to claim 1, wherein the multi-stage positioning means comprises a gasket provided between the rotary piece and the body.

* * * * *